(12) United States Patent
Horiuchi et al.

(10) Patent No.: US 9,874,903 B2
(45) Date of Patent: Jan. 23, 2018

(54) FOOT ASSEMBLY SYSTEM

(71) Applicant: LENOVO (SINGAPORE) PTE. LTD., Singapore (SG)

(72) Inventors: Shigehiro Horiuchi, Tokyo-to (JP); Fumitake Mizoguchi, Yamato (JP); Masaaki Bandoh, Yamato (JP); Tatsuya Ushioda, Yokahama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 18 days.

(21) Appl. No.: 15/162,834

(22) Filed: May 24, 2016

(65) Prior Publication Data
US 2017/0344066 A1 Nov. 30, 2017

(51) Int. Cl.
*G06F 1/16* (2006.01)
*H05K 5/00* (2006.01)

(52) U.S. Cl.
CPC .................................. *G06F 1/1633* (2013.01)

(58) Field of Classification Search
CPC ..... G06F 1/1633; G06F 1/1613; G06F 1/1675
USPC .......................... 361/679.59, 679.55, 679.56, 361/679.21–679.3, 679.01, 679.02
See application file for complete search history.

(56) References Cited

U.S. PATENT DOCUMENTS

| | | | | |
|---|---|---|---|---|
| 5,688,030 A * | 11/1997 | McAnally | ............... | G06F 1/181 248/500 |
| 7,697,282 B2 * | 4/2010 | Jackson | .................. | G06F 1/181 361/679.59 |
| 7,715,190 B2 * | 5/2010 | Tang | ..................... | G06F 1/1616 361/679.55 |
| 7,746,636 B2 * | 6/2010 | Tang | ..................... | G06F 1/1616 361/679.55 |
| 7,855,883 B2 * | 12/2010 | Tang | ..................... | G06F 1/1616 361/679.55 |
| 8,531,836 B2 * | 9/2013 | Iwamoto | ................. | G06F 1/166 248/677 |
| 8,537,546 B2 * | 9/2013 | Shih | ..................... | H05K 5/0234 361/679.59 |
| 8,845,040 B2 * | 9/2014 | Yang | ..................... | H05K 5/0013 312/222 |
| 8,879,251 B2 * | 11/2014 | Hsiu | ....................... | G06F 1/166 361/679.59 |
| 2009/0122280 A1 * | 5/2009 | Kuroda | ................ | G03B 21/145 353/119 |

* cited by examiner

*Primary Examiner* — Anthony Haughton
(74) *Attorney, Agent, or Firm* — Shimokaji IP

(57) ABSTRACT

Disclosed is a foot assembly system comprising a foot member configured to attach to a base of a device through a cutout in the base. The system may further comprise a cap configured to affix the foot member to the base, wherein the foot member and cap are configured to engage from opposite sides of the base, through the cutout in the base.

6 Claims, 8 Drawing Sheets

FOOT ASSEMBLY SYSTEM

BACKGROUND OF THE INVENTION

The present invention relates to a foot assembly system for an electronic device such as a laptop computer.

An electronic device, such as a laptop computer, may typically include projections, forming foot members, at a bottom surface or base of the device. The foot members may provide slip control and stability when the device is supported on a surface, such as a table top. For example, four foot members may each be disposed near the four corners of a laptop's rectangular base. Each foot member may typically comprise rubber or other slip resistant material.

Conventional methods of joining the foot members to the base include adhesive attachments and heat stacking. Although adhesive attachment processes are less expensive than heat stacking, such processes may be difficult to control. Additionally, the foot members may peel off, as an adhesive element on the outer surface of the device may be exposed to wear and tear (e.g. moisture from accidental spills, mechanical pressure, etc.).

As can be seen, there is a need for an improved system for assembly of a foot member onto the base of an electronic device, which is well controlled, cost effective, and provides a wear resistant attachment of the foot member.

SUMMARY OF THE INVENTION

In one aspect of the present invention, a foot assembly for a device comprises a foot member configured to attach to a base of the device through a cutout in the base, wherein the foot member comprises an attachment member configured to insert into the cutout from a bottom surface of the base, wherein the cutout comprises an attachment channel configured to capture the attachment member within the cutout.

In another aspect of the present invention, a foot assembly for a device comprises a foot member; and a cap, wherein the foot member is configured to attach to a base of the device from a bottom surface of the base and through a cutout in the base, wherein the cap is configured to engage with the base from a top surface of the base and through the cutout, and wherein the cap is configured to affix the position of the foot member to the base.

In yet another aspect of the present invention, a foot assembly method comprises inserting a foot member within a cutout of a base of a device from a bottom surface of the base; and capturing an attachment element of the foot member within the cutout to affix the foot member to the base.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. However, any single inventive feature may not address any of the problems discussed above or may only address one of the problems discussed above. Further, one or more of the problems discussed above may not be fully addressed by any of the features described below.

Various inventive features are described below that can each be used independently of one another or in combination with other features.

Broadly, the present invention provides a foot assembly system, comprising a foot member configured to attach to a base of a device through a cutout in the base. The system may further comprise a cap configured to affix the foot member to the base, wherein the foot member and cap are configured to engage from opposite sides of the base, through the cutout in the base.

Figure 2A:
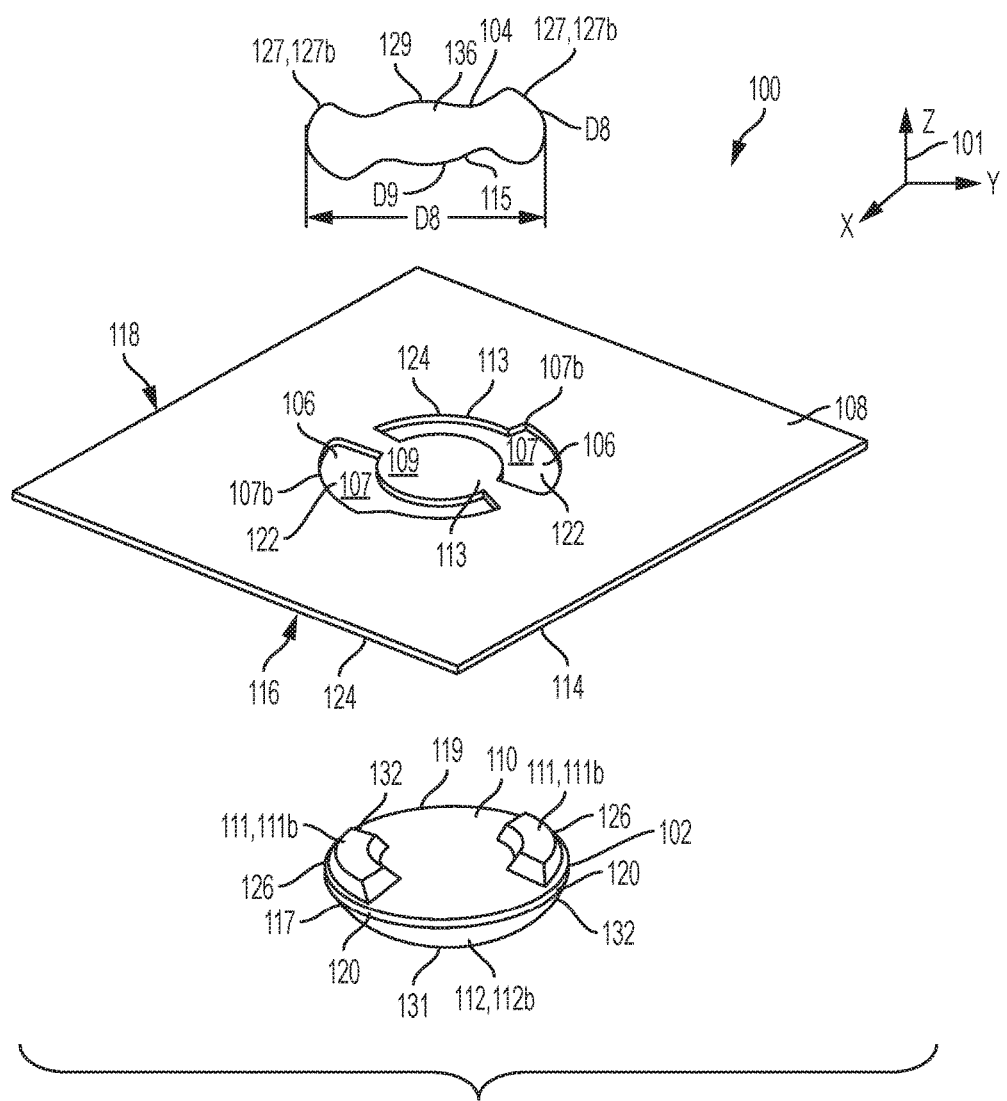
FIG. 2A is an exploded perspective view of a foot assembly in accordance with another embodiment of the present invention.
Figure 2B:
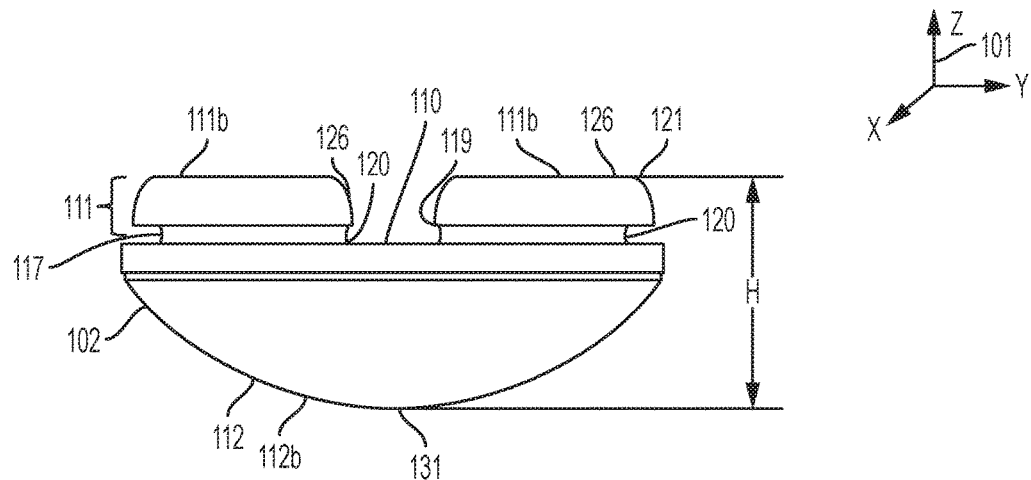
FIG. 2B is a side view of a foot member of the assembly of FIG. 2A.
Figure 2C:
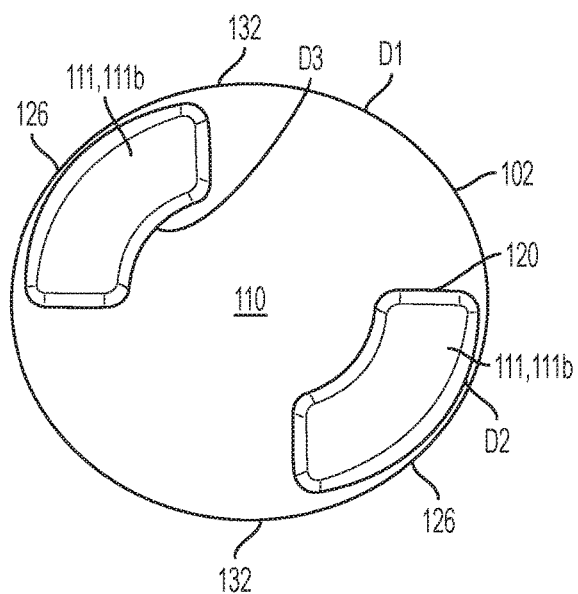
FIG. 2C is a top view of the foot member of the assembly of FIG. 2A.
Figure 2D:
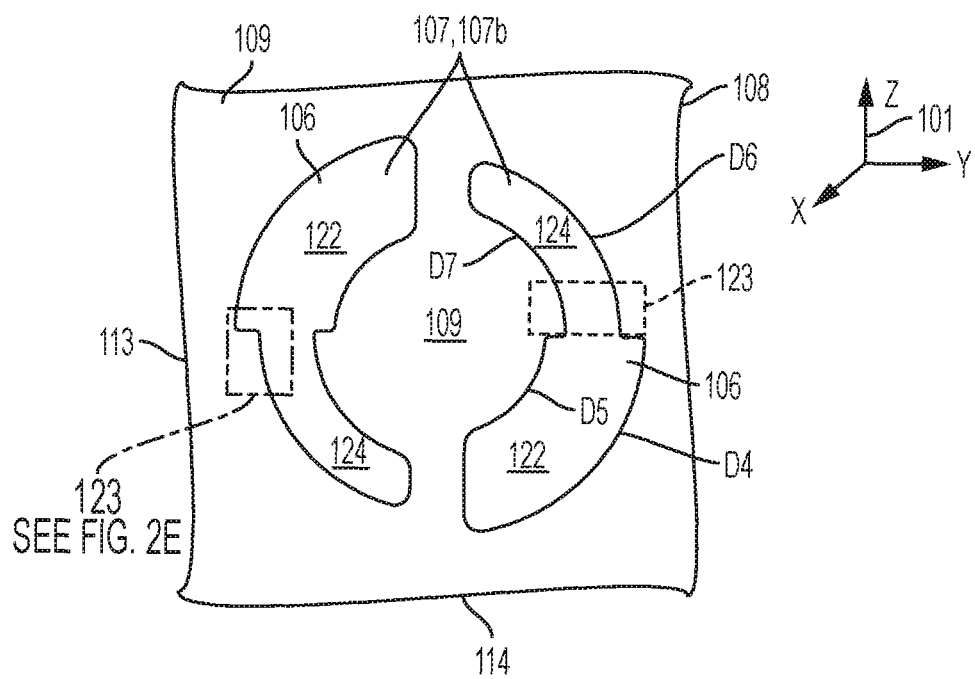
FIG. 2D is a top view of a cutout of the assembly of FIG. 2A.
Figure 2E:
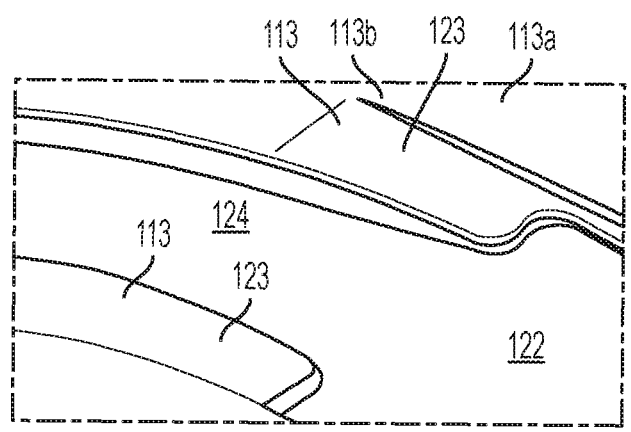
FIG. 2E is an enlarged view of an entry segment adjacent a cutout of the assembly of FIG. 2A.
Figure 3:
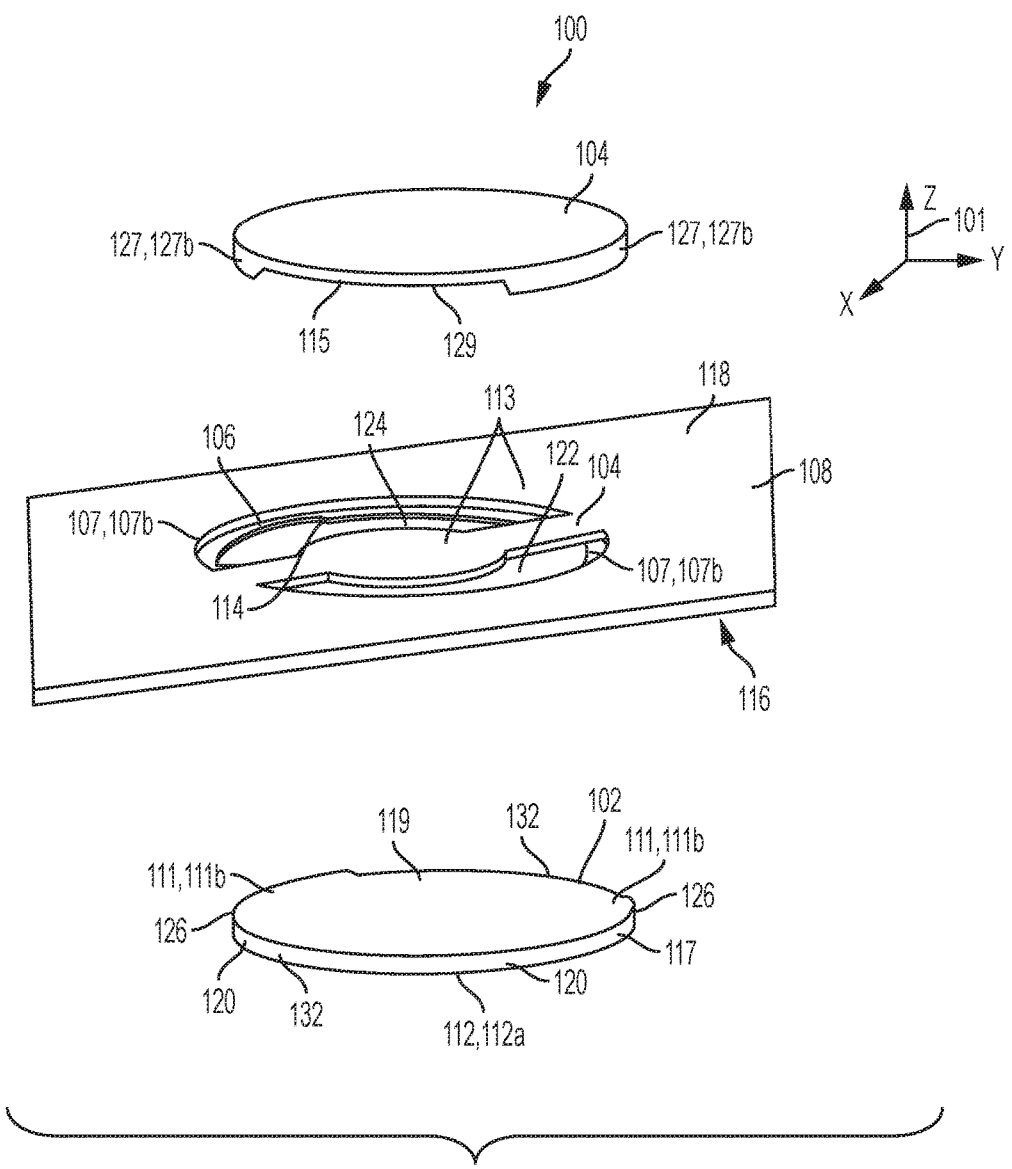
FIG. 3 is an exploded perspective view of a foot assembly in accordance with another embodiment of the present invention.
Figure 4:
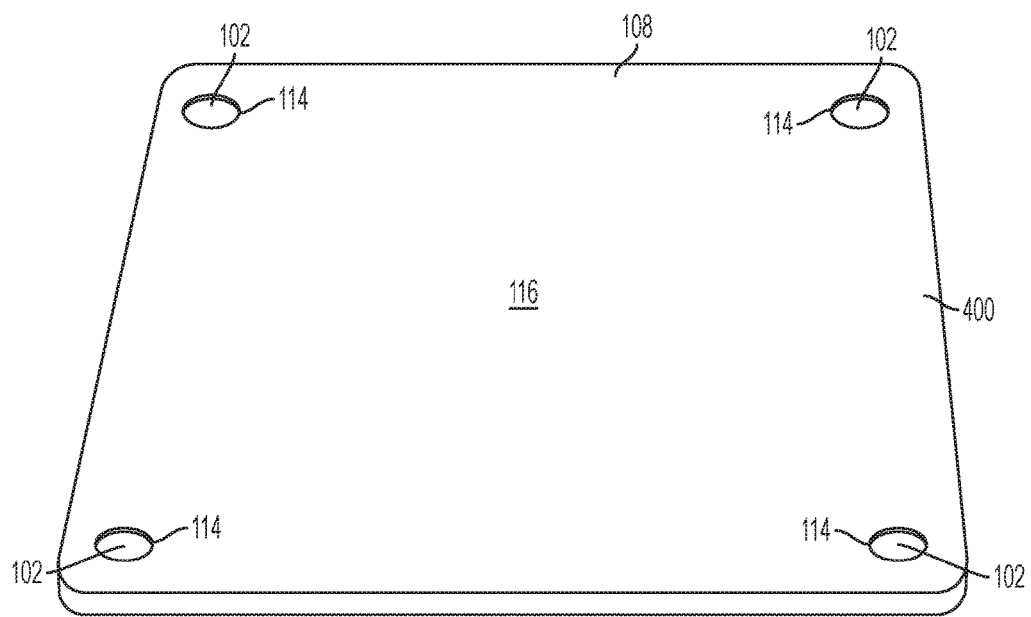
FIG. 4 is a bottom view of a device comprising foot members in accordance with an embodiment of the present invention.

In accordance with various embodiments, FIGS. 1-4 illustrate a foot assembly 100, for a base cover 108 ("base") of a device 400, comprising a foot member 102 configured to attach to the base 108 through a cutout 106 in the base 108. The assembly 100 may further comprise a cap 104, wherein the foot member 102 and the cap 104 are configured to fixedly attach to the base 108 through the cutout 106. According to various embodiments, as shown in FIG. 4, the device 400, which may be an electronic device such as a laptop computer, tablet, etc., may comprise a plurality of foot members 102 of assembly 100, attached to the base 108 of the device 400.

The foot member 102 may be configured to non-adhesively, or mechanically, attach to the base 108 through the cutout 106. The foot member 102 and/or cap 106 may be configured to mechanically attach to the base 108 through the cutout 106, without heat stacking. The cap 104 and/or the foot member 102 may be configured to hold the assembly in a fixed position with respect to the base 108. The foot member 102 may be configured to movably attach to the base through the cutout 106, while the cap 104 may be configured to hold the foot member 102 in place with respect to the base 108. The foot member 102 may be configured to engage with the base 108 from a base bottom surface 116, and the cap 104 may be configured to engage with the base from a base top surface 118.

Figure 1:
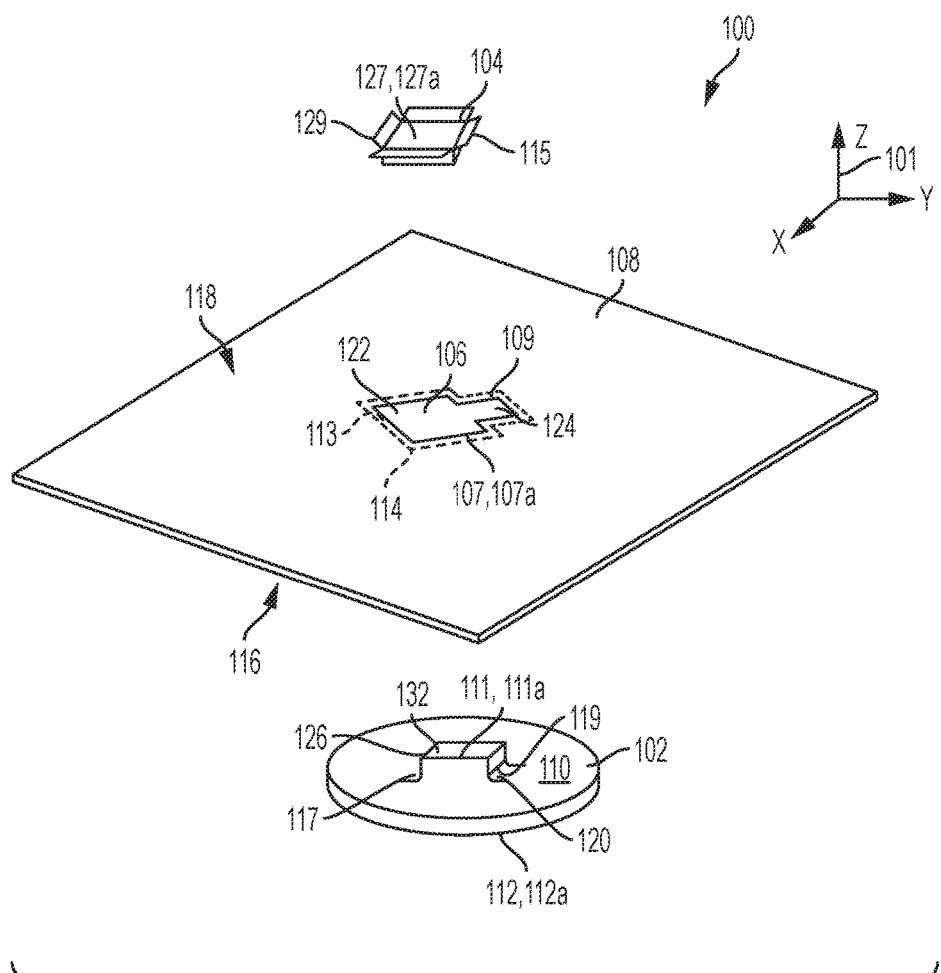
FIG. 1 is an exploded perspective view of a foot assembly in accordance with an embodiment of the present invention.

According to various embodiments, shown in FIGS. 1-3, the foot member 102 may comprise a foot top surface 110 and a foot bottom surface 112, opposite the foot top surface 110. The foot top surface 110 comprises at least one attachment member 111. The foot top surface 110 may be flat such that it may evenly abut a cutout adjacent bottom portion 114, which is a portion of the base bottom surface 116 immediately adjacent the cutout 106.

The foot bottom surface 112 may comprise a non-slip surface configured to support the device 400 on a surface such as a table top, wherein the non-slip surface may have a frictional coefficient value higher than that of a material of the base bottom surface 116. The base bottom surface 116 may comprise a smooth metallic material, and the foot bottom surface 112 may comprise a higher friction material such as a plastic, or an elastomer (i.e. rubber), for example. The foot member 102 may be a monolithic unit.

The attachment member 111 may be undercut at a segment adjacent the foot top surface 110, forming an attachment neck 120 between attachment head 126 and the foot top surface 110, whereby an attachment slot 117 is formed between a lower surface 119 of the attachment head 126 and the foot top surface 110.

The cutout 106 can be configured to receive the attachment member 111. The cutout 106 may comprise at least one cutout channel 107 comprising an insertion channel, which may be a wide cutout portion 122, and an attachment channel, which may be a narrow cutout portion 124 tapered from wide cutout portion 122.

The wide cutout portion 122 can be sized and configured to receive the attachment member 111 through the attachment head 126, wherein insertion of the attachment member 111 through the attachment head 126 is stopped by contact between the foot top surface 110 and cutout adjacent bottom portion 114. Additionally, the narrow cutout portion 124 may be sized to receive the attachment neck 120, but not the attachment head 126, whereby insertion of the attachment member 111 through the wide cutout portion 126, followed by a translation of the attachment member 111 into the narrow cutout portion 126 engages and captures the attachment neck 120 within the narrow cutout portion 124 and between the attachment head 126 and the foot top surface 110. A cutout adjacent base portion 109, which is a portion of the base 108 immediately adjacent the cutout at the narrow cutout portion 124 is likewise captured within the attachment slot 117.

With continued reference to FIGS. 1-3, and with particular reference to FIG. 2E, the cutout 106 may comprise an entry segment 123 between the wide cutout portion 122 and the narrow cutout portion 124, on a cutout adjacent top section 113, which is a portion of the base top surface 118 immediately adjacent the cutout 106. The entry segment may be a chamfered and/or sloped upwards from a section 113a adjacent the wide cutout portion 122 to a section 113b adjacent the narrow cutout portion 124, to form a ramp to ease the translation of the attachment member 111 into the narrow cutout portion 126. The attachment slot 117 may "bite" into cutout adjacent surface 109, as it is translated through the entry segment 123.

The cap 104 may be provided to prevent a reverse translation of the attachment member 111 from the narrow cutout portion 124 back to the wide cutout portion 126. The cap may comprise at least one stopper 127 configured to position adjacent to an attachment member end 132 of the attachment member 111. The stopper 127 may be positioned within wide cutout portion 122 or within a "well" formed between wide cutout portion 122 and the foot top surface 110, as it abuts the base bottom surface 116 (see FIG. 6C).

In one embodiment, the cap 104 may be adhesively affixed to the cutout adjacent top section 113. The cap 104 may be affixed by adhesion of a bottom surface 115 of the stopper 127 to the foot top surface 110. In one embodiment, the cap may comprise a cap portion 129 adjacent the stopper 127, which may be adhesively affixed to the base top surface 118. In embodiments wherein the cap comprises a stopper 127 and a cap portion 129 adjacent the stopper 127, the stopper may extend lower than the cap portion 129, (i.e. along the z-axis), such that it may contact the foot top surface 110, while the cap portion 129 may contact the base top surface 118.

Other methods of affixing the cap 104 may include various mechanical attachment mechanisms as will be apparent to one skilled in the art, e.g. ratchet-type mechanism, friction interlocking, etc. It is noted that as the top surface 118 is generally enclosed within the device 400, an adhesive attachment of the cap 104 would not be affected by most conditions outside the device 400 (i.e. moisture, e.g. through accidental spills, mechanical pressure, etc.) tending to wear the adhesion.

Other mechanisms for preventing a reverse translation of the attachment member 111 without the cap 104 may be apparent to one skilled in the art, and may include, for example, frictional interlocking of the cutout adjacent base portion 109 within the attachment slot 117, a ratchet-type tooth mechanism (i.e., comprising an angled tooth, for example, at cutout adjacent top section 113, between and sloping upwards from wide cutout portion 122 and narrow cutout portion 124), etc. to prevent reverse translation of the engaged attachment member. For example, a ratchet-type tooth may extend from entry segment 123 in various embodiments.

Components of the foot assembly 100 are not limited to any particular geometric configuration or size, and may include any number of attachment members 111, cutout channel 107, stoppers 127, etc., according to various embodiments.

For example, and with reference to axis 101, the bottom surface 112 may comprise a geometrical configuration in the x-y plane which may be circular, square, oval, or stadium, according to various embodiments; a cross-sectional configuration in the y-z or x-z planes may be, for example, parabolic, including circular, rectangular, including square; a high elevation along the z-axis, for example, sufficient to provide protection from accidental spills, according to various embodiments; etc. For example, foot bottom surface 112 may have a flat circular profile 112a as shown in FIGS. 1 and 3, or a parabolic circular profile 112b (i.e., dish) is shown in FIGS. 2A and 2B, according to various embodiments.

Various geometrical configurations of the attachment member 111 and corresponding cutout 106 may include square, rectangular, circular, oval, stadium, non-symmetrical geometries, etc., according to various embodiments. Additionally, the foot member 102 may include one or more than one attachment members 111, wherein the assembly 100 may include a corresponding number of cutout channels 107, and stoppers 127, according to various embodiments.

In embodiments, (see FIG. 1) foot member 102 may include a single attachment member 111a comprising a rectangular geometry, centered with respect to the foot top surface 110, wherein the cutout 106 may include a single cutout channel 107a comprising corresponding rectangular geometries for the wide cutout portion 122 and the narrow cutout portion 124, and wherein the cap 104 may include a stopper 127a comprising a rectangular geometry corresponding to the wide cutout portion 122.

In embodiments, (see in FIGS. 2A-3), the foot member 102 may include two attachment members 111b comprising semi-circular geometries in the x-y plane, which are circumferentially aligned with respect to the foot top surface 110 having a circular geometry. The cutout 106 may include two circumferentially aligned cutout channels 107b comprising corresponding semi-circular geometries. The cutout 106 may form circular segments within base 108, as shown in FIGS. 2A-E. The cutout 106 may form a complete circle wherein the cutout adjacent base portion 109 may be an undercut portion of the base 108 within the circular cutout, as shown in FIG. 3. The cap 104 may include two stoppers 127b corresponding to the wide cutout portions 122 of cutout channels 107b, and configured to stop a rotational translation (i.e. rotation), of the attachment members 111b within cutout channels 107b. The cap portion 129 may be circular. The cap portion 129 may include a central circular segment 136 between the stoppers 127b, forming a "bow tie" geometry as shown in FIG. 2A.

An exemplary foot assembly 100 comprising foot member 102 including the two attachment members 111b, cutout channels 107b, cap 104 including stoppers 127b, and having a parabolic profile 112b of the foot bottom surface 112, as shown in FIGS. 2A-2C, may have circular foot bottom surface 112 with an outer diameter D1 of about 20 mm; symmetrically centered attachment members 111b with a curvature characterized by an outer diameter D2 of about 19.5 mm, and an inner diameter D3 of a about 10.5 mm; and a height H measured from a parabolic vertex 131 to an attachment head top surface 121 of about 4.0 mm.

The cutout 106 of the exemplary foot assembly 100 configured to receive the foot member 102 comprising the two attachment members 111b, may have cutout channels 107b wherein a curvature of the wide cutout portion 122 is characterized by an outer diameter D4 of about 20 mm, and an inner diameter D5 of about 10 mm; and wherein a curvature of the narrow cutout portion is characterized by an outer diameter D6 of about 17.5 mm, and an inner diameter D7 of about 12.5 mm; and may be formed within base 108 having a thickness of about 0.8 mm measured from the base bottom surface 116 to the base top surface 118.

The cap 104 of the exemplary foot assembly 100, may comprise stoppers 127b having a curvature characterized by an outer diameter D8 of 19 mm; a circular cap portion 129 having a diameter D9 of about 10 mm; and a thickness of about 1.7 mm measured from the bottom surface 115 of the stopper 127b to a top surface 130 of the stopper 127b.

Figure 5:
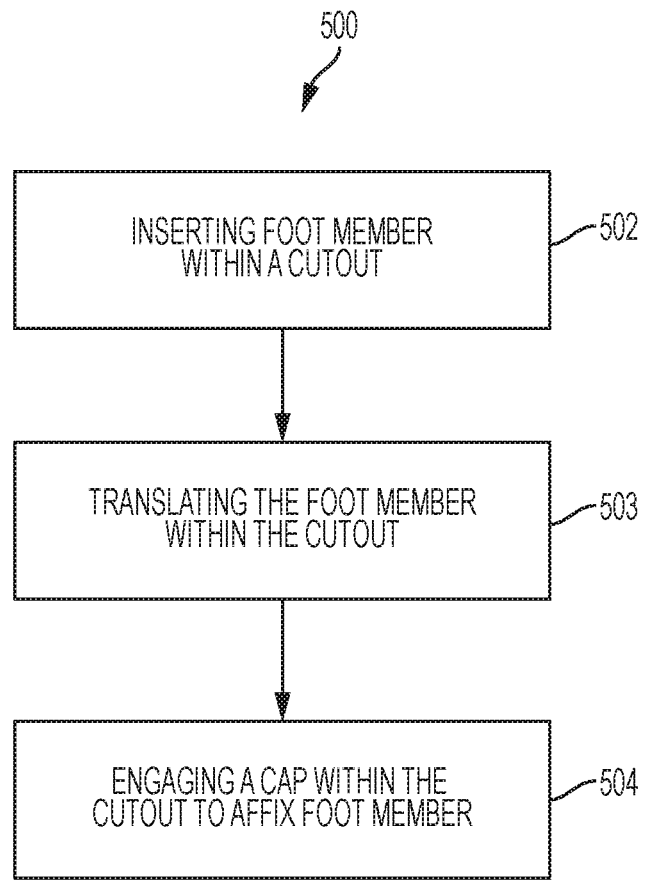
FIG. 5 is a foot assembly method in accordance with an embodiment of the present invention.

With reference to FIGS. 5 and 6, a foot assembly method 500 may comprise inserting a foot member within a cutout of a base from a bottom surface of the base (step 502). The method 500 may further comprise translating the foot member within the cutout to capture the foot member within a narrow portion of the cutout (step 503). The method 500 may further include engaging a cap within the cutout of the base from a top surface of the base to affix the foot member within the cutout (step 504).

The foot member may comprise an attachment element and the cutout may comprise an insertion channel and an attachment channel, wherein the step 502 of inserting the foot member within the cutout may include inserting the attachment element through the insertion channel, and wherein the step 503 of translating the foot member within the cutout may including translating the foot member into the attachment channel to engage and capture the attachment element. The cutout may be circular, such that the step 503 of translating the foot member within the cutout may comprise rotating the foot member. The step 504 of engaging a cap within the cutout of the base affixes the foot member by disabling its translation from the attachment channel back into the insertion channel.

Figure 6A:
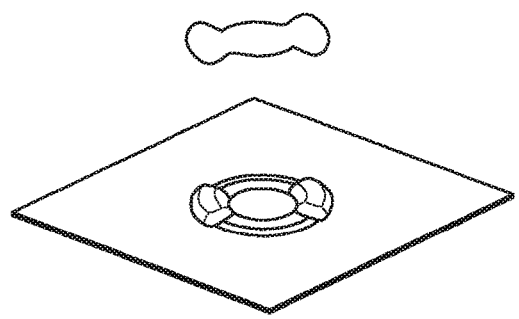
FIG. 6A is a perspective view of the foot assembly of FIG. 2A, after an assembly step of FIG. 5.
Figure 6B:
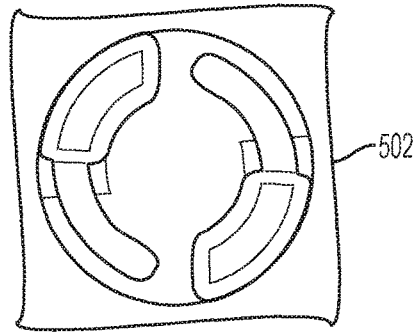
FIG. 6B is a top view of FIG. 6A.
Figure 6C:
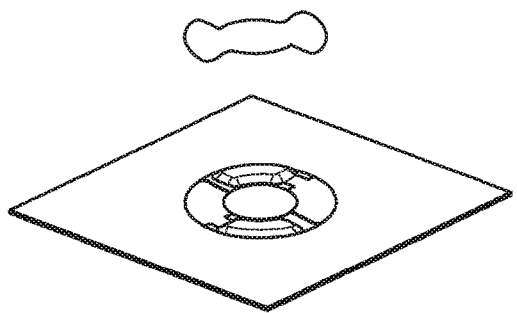
FIG. 6C is a perspective view of the foot assembly of FIG. 2A, after another assembly step of FIG. 5.
Figure 6D:
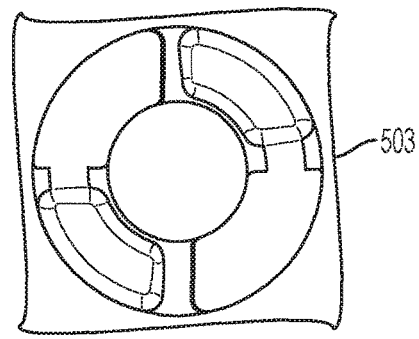
FIG. 6D is a top view of FIG. 6C.
Figure 6E:
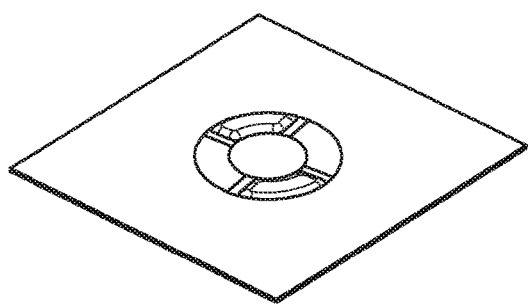
FIG. 6E is a perspective view of the foot assembly of FIG. 2A, after yet another assembly step of FIG. 5.
Figure 6F:
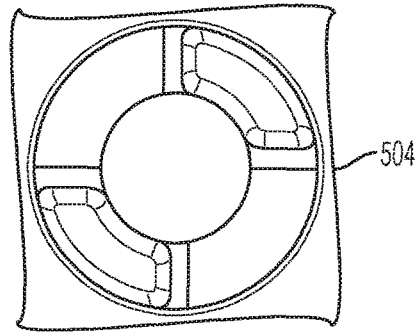
FIG. 6F is a top view of FIG. 6E.

FIG. 6A-E illustrates the foot assembly of FIGS. 2A-E assembled according to method 500. FIGS. 6A and 6B show a foot member inserted within a cutout of a base, according to step 502; FIGS. 6C and 6D show the foot member translated within the cutout, according to step 503; and FIGS. 6E and 6F show a cap engaged within the cutout to affix the foot member within the cutout, according to step 504.

It should be understood, of course, that the foregoing relates to exemplary embodiments of the invention and that modifications may be made without departing from the spirit and scope of the invention as set forth in the following claims.

We claim:

1. A foot assembly for a device comprising:
   a foot member; and
   a cap,
   wherein the foot member is configured to attach to a base of the device from a bottom surface of the base and through a cutout in the base,
   wherein the cap is configured to engage with the base from a top surface of the base and through the cutout,
   wherein the cap is configured to affix the position of the foot member to the base,
   wherein the cutout comprises an insertion channel and an attachment channel, wherein the foot member comprises an attachment member configured to reversibly insert through the insertion channel, and translate into the attachment channel, wherein the attachment channel is configured to capture the attachment member within the cutout, and
   wherein the cap has at least one stopper configured to be positioned adjacent to an end of the attachment member and fit within the insertion channel in order to prevent a reverse translation of the attachment member from the attachment channel into the insertion channel (122).

2. A foot assembly for a device comprising:
   a foot member; and
   a cap,
   wherein the foot member is configured to attach to a base of the device from a bottom surface of the base and through a cutout in the base,
   wherein the cap is configured to engage with the base from a top surface of the base and through the cutout,
   wherein the cap is configured to affix the position of the foot member to the base,
   wherein the cutout comprises first and second insertion channels and first and second attachment channels,
   wherein the foot member (102) comprises first and second attachment members (111b), the first attachment member being configured to reversibly insert through the first insertion channel (107b), and translate into the first attachment channel (124); the second attachment member (111b) being configured to reversibly insert through the second insertion channel (107b), and translate into the second attachment channel (124),
   wherein the first attachment channel is configured to capture the first attachment member within the cutout, and the second attachment channel is configured to capture the second attachment member within the cutout, and wherein the first and second attachment members have semi-circular geometries, wherein the cutout includes two circumferentially aligned cutout channels comprising corresponding semi-circular geometries, and wherein the cap includes first and second stoppers configured to insert and fit within the first and second insertion channels in order to prevent a reverse translation of the attachment members from the attachment channels into the insertion channels.

3. The foot assembly of claim 1, wherein the attachment member translates into the attachment channel by rotation.

4. The foot assembly of claim 1, wherein the device is a computer, and wherein the foot member is configured to support the device on a bottom surface of the foot member.

5. The foot assembly of claim 2, wherein the attachment members translate into the attachment channel by rotation.

6. The foot assembly of claim 2, wherein the device is a computer, and wherein the foot member is configured to support the device on a bottom surface of the foot member.

\* \* \* \* \*